United States Patent
Jacobson et al.

(10) Patent No.: US 10,104,041 B2
(45) Date of Patent: *Oct. 16, 2018

(54) CONTROLLING THE SPREAD OF INTERESTS AND CONTENT IN A CONTENT CENTRIC NETWORK

(71) Applicant: CISCO TECHNOLOGY, INC., San Jose, CA (US)

(72) Inventors: Van L. Jacobson, Montara, CA (US); Diana K. Smetters, Belmont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/261,170

(22) Filed: Sep. 9, 2016

(65) Prior Publication Data

US 2016/0380970 A1    Dec. 29, 2016

Related U.S. Application Data

(63) Continuation of application No. 12/338,175, filed on Dec. 18, 2008, now Pat. No. 9,456,054.

(Continued)

(51) Int. Cl.
*H04L 9/30*       (2006.01)
*H04L 9/32*       (2006.01)
(Continued)

(52) U.S. Cl.
CPC ........ *H04L 63/0227* (2013.01); *G06F 15/173* (2013.01); *H04L 9/006* (2013.01);
(Continued)

(58) Field of Classification Search
CPC .................................................... H04L 67/327
See application file for complete search history.

(56) References Cited

U.S. PATENT DOCUMENTS 817,441 A    4/1906   Niesz
4,309,569 A    1/1982   Merkle
(Continued)

FOREIGN PATENT DOCUMENTS

DE       1720277 A1    6/1967
DE     19620817 A1    11/1997
(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Fatoumata Traore

(57) ABSTRACT

One embodiment of the present invention provides a system for controlling the spread of interests and content in a content centric network (CCN). During operation, the system maintains a routing policy for content data. The system also receives a packet associated with a piece of content or an interest for the content. Next, the system determines that the structured name included in the packet is within the namespace specified in the routing policy. The system further determines that the packet satisfies the condition in the routing policy. Subsequently, the system routes the packet based on in part the action corresponding to the condition as specified in the routing policy.

24 Claims, 3 Drawing Sheets

Related U.S. Application Data

(60) Provisional application No. 61/054,044, filed on May 16, 2008.

(51) Int. Cl.

| | | |
|---|---|---|
| *H04L 29/06* | (2006.01) | |
| *G06F 15/173* | (2006.01) | |
| *H04L 12/751* | (2013.01) | |
| *H04L 29/08* | (2006.01) | |
| *H04L 9/00* | (2006.01) | |
| *H04L 9/14* | (2006.01) | |
| *H04L 12/741* | (2013.01) | |
| *H04L 12/813* | (2013.01) | |
| *H04L 12/823* | (2013.01) | |

(52) U.S. Cl.
CPC .............. *H04L 9/14* (2013.01); *H04L 9/30* (2013.01); *H04L 9/3247* (2013.01); *H04L 45/08* (2013.01); *H04L 45/74* (2013.01); *H04L 47/20* (2013.01); *H04L 47/32* (2013.01); *H04L 63/06* (2013.01); *H04L 63/1458* (2013.01); *H04L 63/20* (2013.01); *H04L 67/327* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,212,183 B1* | 4/2001 | Wilford ................ H04L 45/00 370/383 |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,792,423 B1* | 9/2004 | Jeffries ............. G06F 17/30985 |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1* | 12/2005 | Menditto .......... H04L 29/12113 709/217 |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| 7,110,407 B1* | 9/2006 | Khanna .................. H04L 45/00 370/392 |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2* | 10/2007 | Moskowitz ........ G06Q 30/0601 370/229 |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |

(56) References Cited

U.S. PATENT DOCUMENTS

| | | |
|---|---|---|
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0118841 A1* | 5/2007 | Driver ............... G06F 9/542 719/314 |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |

(56) References Cited

U.S. PATENT DOCUMENTS

| | | |
|---|---|---|
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0092124 A1 | 4/2009 | Singhal et al. |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden et al. |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |

(56) References Cited

U.S. PATENT DOCUMENTS

| | | |
|---|---|---|
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan al. |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| EP | 0295727 A2 | 12/1988 |
| EP | 0757065 A2 | 7/1996 |

(56) References Cited

FOREIGN PATENT DOCUMENTS

| | | |
|---|---|---|
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| EP | 2214356 | 5/2016 |
| JP | 2000354067 A | 12/2000 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: An architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heal pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCN 2012, Munich, Germany, Jul.-Aug. 2012, pp. 1-7.

(56) References Cited

OTHER PUBLICATIONS

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, Gene Tsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Saha!, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPF: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking,

(56) References Cited

OTHER PUBLICATIONS

Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

(56) References Cited

OTHER PUBLICATIONS

J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%20%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]—[006], [0011], [0013]* *figures 1,2*.
Marc Mosko et al "All-in-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

* cited by examiner

CONTROLLING THE SPREAD OF INTERESTS AND CONTENT IN A CONTENT CENTRIC NETWORK

RELATED APPLICATION

This application is a continuation of:
U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008,
which claims the benefit under 35 U.S.C. § 119(e) to:
U.S. Provisional Patent Application No. 61/054,044, entitled "CONTENT-CENTRIC NETWORKING: POLICY ROUTING AND FIREWALLING," by inventors Van L. Jacobson and Diana K. Smetters, filed 16 May 2008,
the disclosures of which are incorporated by reference herein.

The subject matter of this application is related to the subject matter in the following applications:
U.S. patent application Ser. No. 12/123,344, entitled "VOICE OVER CONTENT CENTRIC NETWORKS," by inventors Paul Stewart, Van L. Jacobson, Michael Plass, and Diana K. Smetters, filed 19 May 2008; and
U.S. patent application Ser. No. 12/332,560, entitled "METHOD AND APPARATUS FOR FACILITATING COMMUNICATION IN A CONTENT CENTRIC NETWORK," by inventor Van L. Jacobson, filed 11 Dec. 2008.
the disclosures of which are incorporated by reference in their entirety herein.

FIELD

The present disclosure relates generally to facilitating communication over a data network. More specifically, the present disclosure relates to a method for controlling the spread of interests and content in a content centric network.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of content can only receive the content by explicitly requesting the content from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than what the ARPAnet was designed for. Ideally, an Internet user should have access to any content, anywhere, at any time. Such access is difficult to guarantee with the current location/device-binding IP protocol.

Under current web-based naming structures, an idea of the host is implicit in the name which contains the corresponding content. For example, http://www.amazon.com/index.html can be found by contacting the machine www.amazon.com. But this contact requires a Domain Name System (DNS) to translate a human-readable host name into an IP address (e.g., 209.34.123.178). In current computer systems, there is no way to refer to a piece of content without knowing what host that file is stored on, and even then the contents associated with that file might change.

Some computer systems use distributed hash tables (DHTs) to locate content by naming content with fixed-length keys, typically 160-bit opaque binary blobs. To retrieve a piece of content, a DHT-enabled system first obtains the content's "name," and then uses a mapping from this name onto a set of servers in order to determine the server or servers from which the content might be retrieved.

DHT systems use opaque binary names that are treated as keys to indicate which host or hosts in a self-organizing ring of DHT hosts are responsible for holding that content. However, DHT names are not human-readable names. In addition, DHT systems assume a fully connected network, where content will always be found at a particular location based on in part the 160-bit opaque name.

DHT systems use opaque binary names that are treated as keys to indicate which host or hosts in a self-organizing ring of DHT hosts are responsible for holding that content. However, DHT names are not human-readable. In addition, DHT systems assume a fully connected network, where content will always be found at a particular location based on in part 160-bit opaque name.

Other computer systems in peer-to-peer networks typically find content by title either indirectly through a directory server (e.g., Napster), which maintains a lookup table that maps content names to hosts, or by flooding interest to all the hosts in the network, along with information about where to return matching results to the interest.

Content names in all of these approaches are "flat," with no relationship contained in them other than perhaps what host holds them.

Protocol-Independent Multicast Sparse Mode (PIM-SM) is a protocol that allows routing content on-demand using tree-based routing. In PIM-SM, nodes interested in receiving particular IP multicast "channels" (represented as IP addresses drawn from the set designated for multicast) register to receive that content with a multicast-capable router or switch "upstream" from them. That router then recursively registers to receive that content. When the content is generated on that address, the routers can look at their various outgoing interfaces or switch ports for those where such interest has been registered, and forward the new content only on those.

PIM-SM and other forms of multicast routing only generate multicast trees over a small space of IP addresses and do not provide flow control. In other words, a single interest in content can open the floodgates for any and all available content, thus potentially drowning a network and causing multicasting to be disabled or throttled back. This is because PIM-SM and other forms of multicast routing do not cause an interest to be consumed when matching content is found.

SUMMARY

One embodiment of the present invention provides a system for controlling the spread of interests and content in a content centric network (CCN). During operation, the system maintains a routing policy for content data. The routing policy specifies a namespace, a condition, and a routing action corresponding to the condition. The namespace corresponds to one or more structured names, each of which is unique and persistent with respect to certain content. The namespace includes at least part of a content name which can be used to match content with a more specific name that falls logically within the scope of the name space. The condition specifies when the routing action can be taken upon receipt of data packets associated with the namespace. The system also receives a packet associated with a piece of content or an interest for the content. The content is identified by a structured name and the structured name in the packet includes authentication information for the content. Next, the system determines that the structured name included in the packet is within the namespace specified in the routing policy. The system further determines that the packet satisfies the condition in the routing policy. Subsequently, the system routes the packet based on in part the action corresponding to the condition as specified in the routing policy.

In one variation on this embodiment, the system determines that the structured name included in the packet is within the namespace by using a longest-name match policy to match the structured name against the namespace.

In one variation on this embodiment, routing the packet includes one or more of: dropping content packets, thereby preventing creation of content with a certain name; dropping interest packets, thereby preventing interests from circulating; forwarding the packet to another node; copying or redirecting the packet; deferring action on the packet; and applying a default policy when no conditions match.

In one variation on this embodiment, determining that the packet satisfies the condition includes matching one or more of: an identity of a signer of the content by using a public key, a credential held by a signer of the content; an identity of a node generating an interest by using a public key, a network interface on which the packet arrived, and a network address indicating where the packet is originated or destined.

In one variation on this embodiment, the system automatically retrieves keys and credential information (from the CCN) to check policy compliance, where the keys and credential information.

In one variation on this embodiment, the interest corresponds to a portion of the content system, sending the content to the interest owner comprises sending only a portion of the content to the interest owner, and continued receipt of interests of the same content facilitates flow control of the delivery of the content.

In one variation on this embodiment, the system stochastically verifies the routing policy by router nodes, thus enabling an overall expected level of policy compliance and verification.

In one variation of this embodiment, the system dynamically retrieves the policy from the CCN and dynamically updates the policy.

In one variation of this embodiment, the system defeats a denial-of-service attack against a policy enforcement system by greylisting keys so that automatic retrieval of keys is deferred.

In one variation of this embodiment, the system propagates the routing policy to an upstream node, whereby the upstream node can optionally enforce the routing policy and filter content.

DETAILED DESCRIPTION

Figure 1:
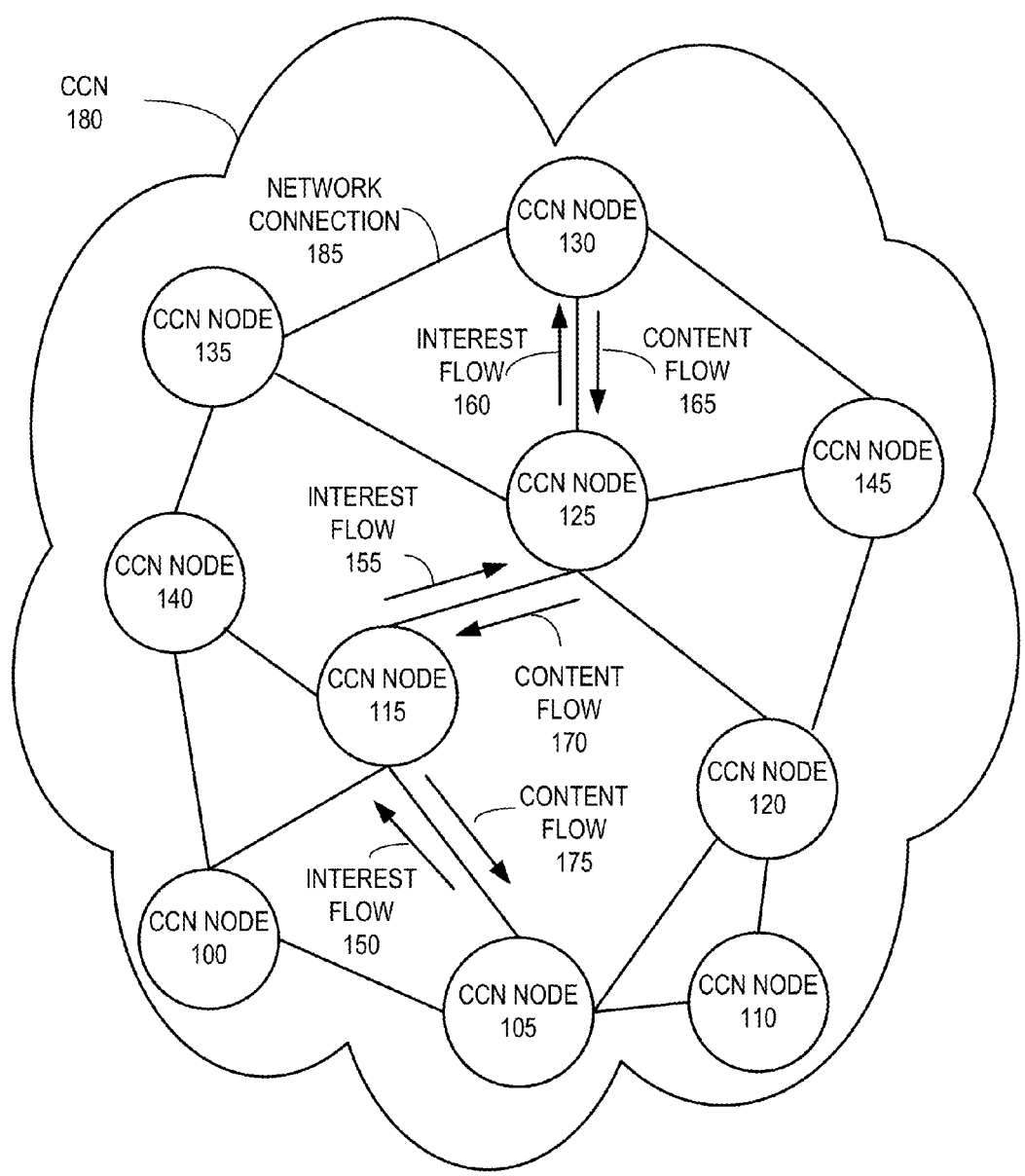
FIG. 1 illustrates an exemplary CCN in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

A content centric network (CCN) brings a new approach to content transport. Instead of having network traffic viewed at the application level as end-to-end conversations over which content travels, content is requested or returned based on in part the name given to it, and the network is responsible for routing content from the provider to the consumer. Content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc. The present invention comprises a computer-implemented system to facilitate communication in a CCN. We will refer to the system interchangeably with the CCN, as the properties of the system are the properties of the CCN and vice versa.

A CCN can significantly improve the efficiency and usability of content dissemination by enabling content caching. A CCN can also improve content mobility by enabling content to move. This is because in a CCN content can be addressed by name rather than location.

In some embodiments, a CCN host can identify, request, and disseminate content based on in part the content's name, as opposed to a name of a content container, such as a file.

Unlike IP addresses, a content name does not necessarily indicate the location of the content, and the CCN is responsible for routing the content. In a CCN, content names are persistent and content-specific. That is, if one changes the content, the content is effectively associated with a new name. This persistency can be achieved with an explicit versioning mechanism, where, for example, the new content can be "version 4" of a given name. The persistency can also be achieved implicitly. For example, contents can be associated with not only their human-established names, but also with authentication meta-data (e.g., a digital signature by the publisher of the content). As a result, the name associated with content changes when the content change.

Functionally, a CCN can retain association between various names and the content which they represent. In one embodiment, the names are hierarchical and in many situations can be understood by a user. For example, "/abcd/bob/papers/ccn/news" could be the name of the content, i.e., the "news" article from the "ccn" collection of papers for a user named "Bob" at the organization named "ABCD." In a CCN, there is no need for a content consumer to determine how to find the "ABCD" organization, or to find which host holds Bob's CCN publications from an application's perspective. Note that a content consumer is any entity, person, or machine that requests the content.

In one embodiment, to request a piece of content, a CCN node registers (e.g., broadcasts) an interest in that content by the content's name. An interest in a piece of content can be a query for the content according to the content's name or identifier. The content, if available in the network, is routed back to it by the host that stores the content. In one embodiment, the routing infrastructure intelligently propagates the interest to the prospective nodes that are likely to have the information and then carries available content back along the path which the interest traversed.

A CCN has additional properties which make it especially appealing. For example, all content can be cryptographically authenticated, meaning that some subset of nodes on the network (e.g., a legitimate querier of the content) can verify the authenticity of a piece of content. A CCN also allows content to be accessed by name, independent of its publisher.

At the same time, embodiments of the present invention can specialize requests for content by a certain publisher. For example, one can ask for "foo.txt," or "foo.txt signed by Bob." Any name forms can be agreed upon by and used as a contract between a producer and the consumer. For example, "self-verifying" names are a special class of names where the name itself directly identifies the content it refers to—for example, naming a piece of content by its cryptographic (e.g. SHA-1) digest. A user who has obtained the name can be certain that he has obtained the correct content for that name by verifying this correspondence. Furthermore, CCN permits a much wider range of authenticated name mappings, because the producer digitally signs their chosen name for the content along with the content itself. It is therefore possible to securely determine what content is "Bob's content for the name foo.txt" without having to use an opaque self-verifying name that must be securely transmitted. It is also possible to use hybrid self-verifying names, where some components (e.g. in one embodiment, the first component) of the name are for organization and efficient routing and may be user-readable, and the latter components of the name are self-verifying. In one embodiment, a CCN uses such names, wherein a respective CCN name includes a virtual self-verifying component as its last component. In addition, CCN allows the separation of content and trust, enabling different content consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a public key infrastructure (PKI) which that user has chosen to trust.

FIG. 1 illustrates an exemplary architecture of CCN, in accordance with an embodiment of the present invention. In this example, a CCN 180 comprises CCN nodes 100-145. Each node in the CCN is coupled to one or more other nodes. Network connection 185 is an example of such a connection. The network connection is shown as a solid line, but each line could also represent sub-networks or super-networks which can couple one node to another node. CCN network 180 can be a local network, a super-network or a sub-network. Each of these networks can be interconnected so that a node in one network can reach a node in other networks. The network connection can be broadband, wireless, telephonic, satellite, or any type of network connection. A CCN node can be a computer system or an end-point representing users and/or devices that can generate interests or originate content.

In accordance with an embodiment of the present invention, a consumer can generate an interest in a piece of content and then send that interest to a node in CCN 180. The piece of content can be stored at a node in CCN 180 by a publisher or content provider, who can be located inside or outside the network. For example, in FIG. 1, the interest in a piece of content originates at CCN node 105. If the content is not available at the node, the interest flows to one or more nodes coupled to the first node. For example, in FIG. 1, the interest flows (interest flow 150) to CCN node 115, which does not have the content available. Next, the interest flows (interest flow 155) from CCN node 115 to CCN node 125, which again does not have the content. The interest then flows (interest flow 160) to CCN node 130, which does have the content available. The flow of the content then retraces its path (content flows 165, 170, and 175) until it reaches CCN node 105, where the content is delivered. Other processes such as authentication can be involved in the flow of content.

In CCN 180, any number of intermediate nodes (CCN nodes 100-145) in the path between a content holder (CCN node 130) and the interest generation node (CCN node 105) can participate in caching local copies of the content as it travels across the network. Caching reduces the network load for a second subscriber located in proximity to other subscribers by implicitly sharing access to the locally cached content. In FIG. 1, if CCN node 100 were to register an interest in the same content as CCN node 105, a locally cached copy of the content stored on CCN node 115 can satisfy the interest without traversing the entire content path all the way back to CCN node 130.

Furthermore, CCN 180 can provide better fault tolerance because content can be retrieved from multiple nodes if one node fails suddenly. In a CCN, a piece of content can be self-authenticating, which means that the content contains its own authentication. In one embodiment, each fragment of a piece of content can be digitally signed by someone trusted by the consumer so that it can be cached, replicated, and obtained from anyone and its integrity and authenticity confirmed.

In embodiments of the present invention, a CCN host combines self-authenticating content, names which are directly treated as content addresses, and the pairing of interests and data to provide flow control. This approach enables a dynamic, name-based communication protocol. Because of the dynamic routing of interests and content back to interested parties, the resulting network is resilient to node departure and network partition, and provides intrinsic mechanisms to facilitate node mobility. For example, CCN node 100 may migrate and become coupled with CCN node 105. Since CCN 180 finds content by name, a content provider can move from node to node while providing content, much as cell-phone user can move from cell to cell while communicating.

There are significant advantages to a CCN's dynamic name-based routing approach. First, in contrast to DHTs, a content producer has control over who is responsible for storing and providing its content. Other nodes in a CCN can cache that content and provide it as well, but the base nodes which serve as the initial source of content are determined by the default routes for a given name prefix. For DHTs, the node or nodes responsible for serving a particular piece of content are determined semi-randomly by which nodes end up responsible for what portion of the key space. Such nodes' policies and reliability are out of the control of the content producer, and their location might be suboptimal for content retrieval.

Second, security in a CCN is content-based: data can be stored anywhere, or retrieved from anyone. This results in higher data security and significantly increased network efficiency. Third, a CCN can operate in flow balance, providing inherent fairness, rate limitations, and dynamic response to changing network conditions.

A CCN has several properties. One property is that it attempts to maximize the number of nodes that can participate in the CCN by minimizing the expectations about those nodes. For example, by default CCN nodes are not expected to be trustworthy. This means that nodes are not in general reliable enough to enforce access control policies for others. Therefore, in one embodiment, data is expected to be self-protecting (e.g., encrypted) to prevent it from falling into unwanted hands. In general, CCNs operate without any centralized control. This means that anyone can write data to any name, any name can have multiple pieces of data associated with it (even created by the same publisher), and any piece of data can have multiple names.

Another property of the CCN is that a querier may receive multiple pieces of data in response to any interest. This means that it is up to the querier to determine which of the answers to the query is acceptable, according to the querier's own security and trust policies.

A node in the CCN can be made "smarter" (more controlling) by implementing policies that are more restrictive in terms of who can generate content under a given name and/or who can distribute interests and retrieve content under that name.

Smarter policies can create greater network efficiency by dropping unwanted traffic or "spam" on the path to a data consumer, rather than requiring the content to be filtered by the consumer. For example, a smarter policy can reduce congestion near the "last hop" to the consumer, which is typically of lower bandwidth than the paths leading up to that hop. Smarter policies can also limit what data gets into sensitive portions of the namespace and who can retrieve that data.

Overall System Operation

Figure 2:
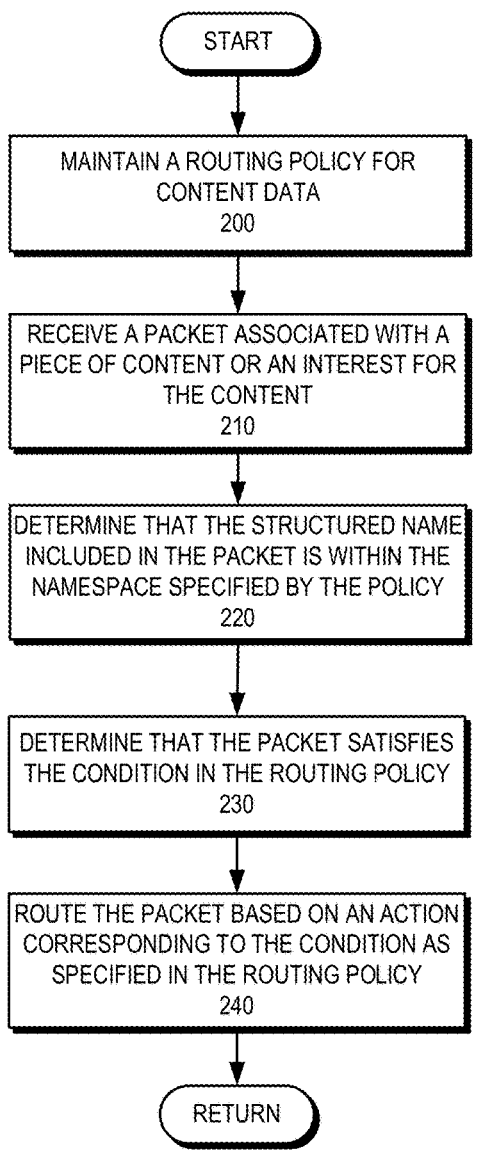
FIG. 2 presents a flowchart illustrating the process of controlling the spread of interests and content in a CCN in accordance with an embodiment of the present invention.

FIG. 2 presents a flowchart illustrating the process for controlling the spread of interests and content in a content centric network (CCN) in accordance with one embodiment of the present invention. During operation, the system maintains a routing policy for content data (operation 200). The routing policy specifies a namespace, a condition, and a routing action corresponding to the condition. The namespace corresponds to one or more structured names, each of which is unique and persistent with respect to certain content. The condition specifies when the routing action can be taken upon receipt of data packets associated with the namespace. The system also receives a packet associated with a piece of content or an interest for the content (operation 210). Next, the system determines that the structured name included in the packet is within the namespace specified in the routing policy (operation 220). The system then determines that the packet satisfies the condition in the routing policy (operation 230). After determining that the packet satisfies the condition, the system routes the packet based on in part the action corresponding to the condition as specified in the routing policy (operation 240).

Named Content

A CCN can associate names with content, where the names are persistent. The term "persistent" means that the content can move around, but the name stays with the content. In previous Internet communication models, if a content server dies and the content moves around, the name for the content (e.g., a universal resource locator, URL) must be changed. In a CCN, the content name remains unchanged. This enables an interest in a piece of content to find the content wherever it might reside.

The term "persistent" also means that if the content changes, then the name changes. The new name can be automatically generated as a version of the original name, can be associated with authentication metadata (e.g., a digital signature by the publisher of the content), or can reflect the nature of the content change.

Names in a CCN can be structured by dividing them into components. For example, in the name "/parc/home/smetters/test.txt," the individual name components are parc, home, smetters, and test.txt. Note that "PARC" is an abbreviation of "Palo Alto Research Center," an exemplary organization used in this disclosure. Structured names also enable efficient routing for named content. A component-wise structure allows a hierarchical organization of names, and a logarithmic efficiency in accessing content by name. There is no single "root" for a CCN naming scheme. However; the naming scheme can be modeled as a forest of trees. Names can be structured in various ways. For example, they can be structured in a left-oriented prefix-major fashion. For example, the name "/parc/home/smetters" can be a "parent" of "/parc/home/smetters/test."

Name components can be binary strings and can be opaque to the underlying network. More generally, a semantic meaning to a name component is an agreement, or convention between name producers and consumers. Names can also be text or in a form where low-level CCN nodes can understand the meaning of "special" name components.

In sum, the system associates names (content identifiers) with content. Because of this naming convention, CCN content can be addressed, located, retrieved, cached, and disseminated by its name. In a CCN, obtaining content means publishing an interest in the name associated with the content. The CCN determines how to route information based on in part the name. Each time an interest is satisfied by content, the interest is erased, thus ensuring flow balance (never sending more data than is wanted). To receive another piece of content, the consumer must express another interest. Thus, a CCN pairs interests with content to provide efficient congestion control, which can be scaled automatically with the properties of network links, regardless of bandwidth.
Name-Based Routing Policy Interests in, or queries for names can be satisfied (i.e., matched) in a prefix-oriented fashion. Name-based routing policies can be of various forms. One form is: if <condition> then <action>. Another form is a default routing policy, which states that if none of the conditions is matched, then a given default action is taken. Actions can include forwarding the packet as intended, dropping the packet, sending or copying the packet somewhere other than where it is intended to go, or deferring sending the packet to avoid downstream congestion.

CCN entities can include names, publishers (or, in the case of interests, consumers) and network interfaces. Publishers and consumers can be identified by their public keys or by meta-information associated with those public keys, such as who certified them. Network interfaces can be standard (e.g., cards that face onto a local Ethernet segment or wireless link). Network interfaces can also be virtual (e.g., pointing onto a multicast channel). CCN can also be implemented as an overlay network on top of the Internet Protocol (IP).

Policy conditions can include: when a given publisher P publishes content with a given name or name prefix N, when a given consumer C expresses an interest in a given name or name prefix N, when an interest for a name or name prefix N arrives or leaves on a given interface, when data for a given name or N arrives on a given interface, when a piece of content arrives, or when the time elapsed since the content was created has surpassed a predetermined threshold. Each of these conditions can include a particular interface on which the content or interest is sent.

An example policy is "only publisher P is allowed to publish content under the name prefix /PARC/home/P," where publishers are identified by their public keys. Another example of a policy is "to publish under the name prefix /PARC, a publisher must have a key certified by the PARC certification authority." The term "certified" can be in the traditional sense of having an X.509 certificate signed by a traditional certificate authority (CA). The term "certified" can also be an alternate form specific to CCNs, in terms of adding data to the CCN such that a trusted entity signs the mapping between a given name and the public key of a particular publisher. More generally, the term "certified" can refer to the publisher or consumer possessing any form of cryptographic or identifying credential of interest to the policy system. Details of these mechanisms are part of the key profile, or key distribution-related naming conventions, for CCNs.

In one embodiment, a CCN routing system uses a "longest-match" name-matching scheme. For example, an interest in "/parc/home/smetters" will match both "/parc/home/smetters/test.txt" and "/parc/home/smetters/bar.txt." The longest match, in terms of the number of name components, is considered the best.

Thus, in a CCN, a router policy is a collection of rules, which map a condition to an action. The condition specifies a name or a name prefix, and optional condition clauses (e.g., restrictions on the signer of a name-content mapping, restrictions on the interface an interest or data item is traversing).

Rules in policy specifications are matched according to a longest-name match policy. Note that CCN names are structured objects. In one embodiment, names are structured in left-oriented prefix-major form). In other words, longer name matches override shorter ones in terms of what policy rules apply—a policy on the namespace prefixed by /parc.com/newuser/enroll would override one specified on /parc.com. Names can also be right-oriented or can have other forms of internal structure. The system can also use more complex name-matching methods.
Caching In one embodiment, a CCN routing system can include a large cache. The cache can rapidly collect copies of all the public keys needed to verify the majority of frequent traffic. The cache enables the system to have a critical fast path through the router. Using cached keys and previously retrieved policy information, resolved data can fly through the router with minimal overhead. The system can further reduce overhead by using stochastic verification. Stochastic verification in this context means the system can check signatures on a probabilistic fraction of packets, where the fraction is dynamically determined by network load and perceived threat, and where the remaining packets are assumed to be correctly signed by who they claim to be signed by. The system can also determine the probabilistic fraction cooperatively among the organization's routers, to ensure that some node, but not every node, checks every packet. Similarly, the system can gain efficiency by verifying policy only where necessary—if an organization's routers trust each other to do their jobs, policy needs to be verified once, on the border or at the data ingress point, and not checked again.
Basic Policy and Router Defense One policy that a CCN router can implement is to verify signatures on the CCN data itself. Without additional policy specifying who is "allowed" to write to a certain name, this simple verification for correctness ensures that the stated publisher (in the form of a specified public key) did indeed sign a particular piece of content.

The system's basic verification provides mechanisms for router defenses against denial-of-service attacks. The verification can also be stochastic, performed with a frequency determined by the perceived risk or level of detected attack. An attack might attempt to slow down or lock the CCN router by sending it a content signed by a number of different keys, which do not exist. Without a router defense, the router might attempt to retrieve those spurious keys and verify both the data and the properties of those keys (e.g., the entity that certified those keys) before deciding it can release that data. If an attacker can cause the router to be so bogged down by such outstanding requests, he can significantly degrade router performance.

To defeat such attacks, the system can use anti-chaffing techniques (where the spurious keys can be considered "chaff" among the "wheat" of correctly constructed keys and data). For example, if one sender sends a large number of randomly keyed data packets, the system can detect that and quarantine that sender. The system can also greylist new keys—hold them in abeyance temporarily, and retrieve them and verify associated data only when resources are available to do so. This enables the system to prevent greylisted keys and data from impacting the throughput of data signed by known senders, while creating minimal impact on temporarily greylisted data of new, legitimate senders.
Router Policy Efficacy One issue with policy routing is that policy routing is only enforced by cooperating routers; consumers cannot rely on policy routing to completely protect them from unwanted data on either the local broadcast network or while they are roaming to networks outside of a managed infrastructure.

However, policy routing can both protect an infrastructure from internal chaff, and significantly reduce the load on end nodes. The system can also further enforce organizational policy by having end nodes themselves implicitly enforce that policy over the applications local to that node (e.g., to control what names those applications write to).

Interest Signing

Policy routing can control who can insert data into a given namespace by limiting who is allowed to sign and propagate certain name-data mappings. The system can further control the network by requiring interest packets to be signed. The same namespace-based policies used to control forwarding of data packets can be used for interests as well. Alternatively, the system can apply separate (consumer and publisher) policies to interests and data.

Interest signing has several properties related to the space of potential policies. First, a policy can require all interest packets to be signed and therefore, in effect, require a "license to send" for any packet sent over a given network. Without an appropriate credential (e.g., the equivalent of a digital certificate), a sender cannot send either interest or data packets, and as those are the only possible packets to send in a CCN world. The result is, in effect, port-based access control for CCNs, which can allow control over who can connect to a given network port (e.g., hardwired network port or virtual wireless port) and send traffic over it. This immediately prevents unauthorized devices from transmitting any packets on the network beyond the local broadcast range. It also prevents such transmission in the equivalent of a switched network for CCNs, where a policy-enforcing network device (analogous to a CCN switch) resides between end nodes and prevents an unauthorized node from sending any packets to the network.

The system can also use interest signing to control who can obtain certain data items from the CCN. In general, access control in a CCN can be enforced by encryption, as one can get data packets from anywhere they happen to be cached. In general, CCN nodes are not trusted and are not expected to enforce an access control policy. However, in the case of a cooperating infrastructure router, a CCN node can be trusted to enforce an access control policy, and to drop interests in a part of a given namespace by anyone unauthorized to view that data. As described before, a policy can be matched by a longest-match of a name-action pair.

To make such a policy effective and to prevent people from requesting data over a local broadcast domain from their immediate peers, and from overhearing the response to such a request by an authorized peer, the system can assume the equivalent of a "switched CCN network" (see above), where end nodes do not see each other's immediate traffic, or where some of their traffic can be sent on channels other than the local broadcast channel.

In general, all sensitive data on a CCN can be encrypted. Encryption provides an additional layer of defense by keeping encrypted data from falling into the wrong hands.

The system can forward only appropriately signed interests and can choose not to combine interests unless the signers are equivalent from the point of view of the policy. The system can also use less verbose policies on interest signing, avoid aggregating signed interests, and drop interests on protected namespaces. The system further can avoid complex behavior, which is likely to result in unwanted and unexpected consequences.

Dynamic Policies and Policy Configuration

The system can use three features of CCN router policy to facilitate configuration and management. First, the CCN router can distribute a router policy by means of the CCN itself. A router, on encountering the first packet referencing a new namespace, can attempt to retrieve any available policy for it for that namespace via the CCN. The router can also automatically express an interest in and receive updates to its existing policies.

Figure 3:
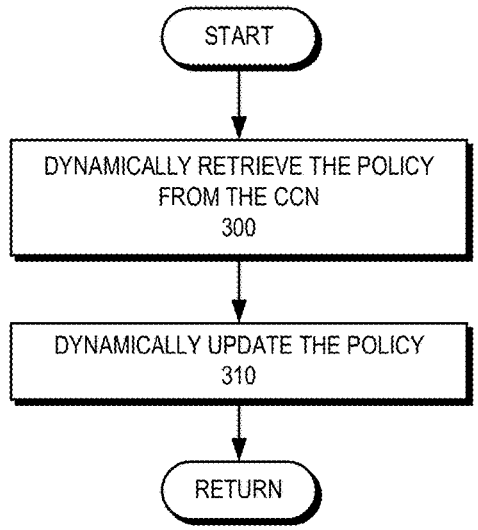
FIG. 3 presents a flowchart illustrating the process of dynamically retrieving the policy from the CCN and dynamically updating the policy in accordance with an embodiment of the present invention.

FIG. 3 presents a flowchart illustrating the process of dynamically retrieving the policy from the CCN and dynamically updating the policy in accordance with an embodiment of the present invention. During operation, the system dynamically retrieves the policy from the CCN (operation 300) and then dynamically updates the policy (operation 310).

Second, it can use cooperative policy enforcement. That is, if all the routers inside an organization are expected to trust one another, they can avoid re-checking each other's work. The system can also stop the propagation of undesirable data by enabling the first router identify and drop the undesirable data, provided the first router that receives the undesirable data is aware that the data is from an entity that is not a trusted router. A "trusted router" can also be an enterprise-configured CCN network stack on any participating node.

Third, the state can be distributed: a policy needs only be specified for those routers that need to know the policy. That is, a policy state needs only to be configured where it will be applied. For example, a policy about data accessible to a customer needs only to live and be maintained on the customer-facing CCN router. This enables easy configuration and management of the router policy.

Fourth, state and policy can be dynamic and data-dependent. As in current state-dependent firewalls, a router's content or interest filtering policy can depend on data or interests (rather than policy statements per se) it has previously seen, or which are made available to the CCN. For example, a state-dependent firewall can allow passage of responses to packets generated inside the firewall and traveling out, but not other inbound packets. Similarly, a CCN policy router can allow stateful "conversations" to pass as a function of the initial packets seen. Policies can be digitally signed, and if distributed can be automatically digitally signed as CCN data, which prevents malicious and unwanted attacks against the policy and routing infrastructure. In this way, the policy-based routing can in effect defend itself.

Policy Errors

Specifically, the system can authenticate name-content associations, rather than just content. For example, what a publisher claims when it inserts content into a CCN is "N is my name for content C." A content publisher can digitally sign the mapping from the name N to the content C. The complete name of a piece of CCN content is the name along with the signature on that name, and content along with a certain amount of additional authentication metadata (e.g., an identifier of the publisher, such as the cryptographic digest of his public key, a timestamp, and a representation of the type of the content).

A router-focused policy, if incorrectly specified, can make data disappear so that it is invisible to users. CCNs, however, are more resilient to black-holing of data than traditional networks because data can follow multiple paths. For example, if one router in between drops data because of a bad policy, the system can route around that router.

Consumer-Specified Policy

The system can create and maintain policy-based filtering by and on behalf of an infrastructure (such as a corporation, on its internal LAN). The system can also use a policy to help end nodes defend against denial-of-service attacks by propagating a node's own policies "upstream" to the nodes serving them data.

Each end node (data producer or consumer) knows its own policies for accepting data, and can verify and appropriately determine whether to trust all the data it receives. However, if a node has a narrow bandwidth connection over which to receive that data, it is at risk of denial of service. A correctly behaving node upstream from an end node can filter content on the end node's behalf, but only if the end node trusts the upstream node to do the filtering and the upstream node knows what policy to apply. The end node can transmit cooperative policy statements to the node upstream from it, which that node might choose to use to pre-filter the data it receives before sending it down to the end node. In effect, the policy of the end node can cooperatively spread to those nodes upstream to it, which can opt (optionally as a function of contractual agreement) to enforce and filter on the end node's behalf. It is not possible to do this today, because there is no common way of naming policies so that the end node can publish them in a way that upstream nodes can consume them.

Policy Firewalling

A special-purpose name-based policy (i.e., a policy firewall) can reside on the "perimeter" of an organization and separates data coming from "inside" from data coming from "outside" (where inside and outside are defined by the administrator of this particular policy-enforcing node). Such a policy can keep illegitimate data that should normally only come from "inside" from passing to the "outside" (e.g., names under the/local namespace, analogous to non-routable addresses in IP). This special-purpose name-based policy can also keep data in recognized sensitive internal namespaces from traveling out without going through a VPN (Virtual Private Network) or other privacy-preserving transport.

Because interests can be drawn through a particular CCN node merely by expressing interests in those interests, such a policy firewall can be constructed more flexibly in terms of its location in network topology than can a traditional firewall.

Moreover, the policy firewall does not need to be on the direct path between two communicating nodes: it can be distributed among multiple nodes and combined to form a firewall as needed. Such policy-based firewalling can be used to defend any physical or virtual perimeter—e.g. an individual node, or a virtual collection of hosts or even content, independent of where that content lives, as long as all the routers servicing requests to that content participate in enforcing the policy.

Computer and Communication System

Figure 4:
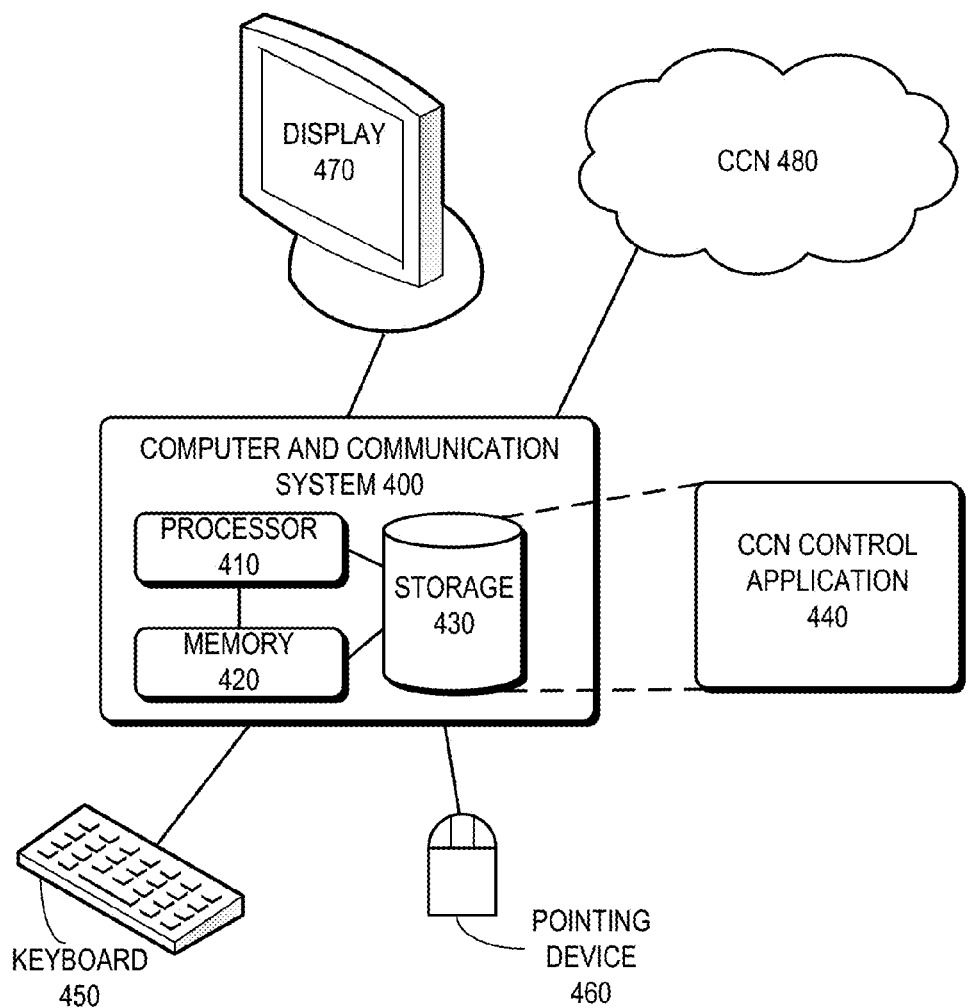
FIG. 4 presents an exemplary computer and communication system for controlling the spread of interests and content in a CCN in accordance with an embodiment of the present invention.

FIG. 4 presents an exemplary computer system for controlling the spread of interests and content in a CCN in accordance with an embodiment of the present invention. In FIG. 4, a computer and communication system 400 includes a processor 410, a memory 420, and a storage device 430, all of which are coupled together. Storage device 430 stores programs to be executed by processor 410. Specifically, storage device 430 stores a program 440 that implements a system (application) for controlling the spread of interests and content in a CCN 480.

Computer and communication system 400 can reside on any node in the CCN. During operation, CCN control application 440 is loaded from storage 430 into memory 420 and executed by processor 410. As a result, computer and communication system 400 performs the functions described above.

Computer and communication system 400 is coupled to an optional display 470, keyboard 450, and pointing device 460. Computer and communication 400 is also coupled to CCN 480, through which it receives and routes content, interests, and policies.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for controlling the spread of interests and content in a content centric network, comprising:
   receiving a packet including a piece of content or an interest for the content, wherein the packet further includes a hierarchically structured name of the content;
   identifying, using a longest-matching lookup of the hierarchically structured name of the content, a routing policy applicable to a longest matching prefix of the hierarchically structured name, wherein the routing policy specifies a condition associated with an originating entity or a destination entity of the packet, and a forwarding action corresponding to the condition;
   in response to determining that the prefix matches the hierarchically structured name of the content and that the originating entity or the destination entity of the packet satisfies the condition in the routing policy, forwarding the packet according to the forwarding action specified in the routing policy;
   in response to determining that the originating entity or the destination entity of the packet does not satisfy the condition in the routing policy, forwarding the packet according to a default forwarding action; and
   defeating a denial-of-service attack against a policy enforcement system by greylisting a public key held by a signer of the content so that automatic retrieval of the public key is deferred.

2. The method of claim 1, wherein the forwarding action comprises one or more of:
   dropping content packets, thereby preventing creation of content with a certain name;
   dropping interest packets, thereby preventing interests from circulating;
   forwarding the packet to another node;

copying or redirecting the packet; and
deferring action on the packet.

3. The method of claim 1, wherein determining that the originating entity or destination entity of the packet satisfies the condition comprises matching an identity of the signer of the content by using a credential held by the signer of the content.

4. The method of claim 1, wherein determining that the originating entity or destination entity of the packet satisfies the condition comprises matching an identity of a node generating the interest by using the public key.

5. The method of claim 1, wherein determining that the originating entity or destination entity of the packet satisfies the condition comprises matching a publisher of the content or a consumer of the content.

6. The method of claim 1, wherein determining that the originating entity or destination entity of the packet satisfies the condition comprises matching one or more of:
a network interface on which the packet arrived; and
a network address indicating where the packet is originated or destined.

7. The method of claim 1, further comprising stochastically verifying the routing policy by router nodes, thus enabling an overall expected level of policy compliance and verification.

8. The method of claim 1, further comprising propagating the routing policy to an upstream node, whereby the upstream node can optionally enforce the routing policy and filter content.

9. An apparatus for controlling the spread of interests and content in a content centric network, comprising:
a processor; and
a memory, wherein the processor is configured to:
receive a packet including a piece of content or an interest for the content, wherein the packet further includes a hierarchically structured name of the content;
identify, using a longest-matching lookup of the hierarchically structured name of the content, a routing policy applicable to a longest matching prefix of the hierarchically structured name, wherein the routing policy specifies a condition associated with an originating entity or a destination entity of the packet, and a forwarding action corresponding to the condition;
in response to determining that the prefix matches the hierarchically structured name of the content and that the originating entity or destination entity of the packet satisfies the condition in the routing policy, forward the packet according to the forwarding action specified in the routing policy;
in response to determining that the originating entity or the destination entity of the packet does not satisfy the condition in the routing policy, forward the packet according to a default forwarding action; and
defeat a denial-of-service attack against a policy enforcement system by greylisting a public key held by a signer of the content so that automatic retrieval of the public key is deferred.

10. The apparatus of claim 9, wherein while forwarding the packet, the processor is configured to perform one or more of the following operations:
dropping content packets, thereby preventing creation of content with a certain name;
dropping interest packets, thereby preventing interests from circulating;
forwarding the packet to another node;
copying or redirect the packet; and
deferring action on the packet.

11. The apparatus of claim 9, wherein while determining that the originating entity or destination entity of the packet satisfies the condition, the processor is configured to match an identity of the signer of the content by using a credential held by the signer of the content.

12. The apparatus of claim 9, wherein while determining that the originating entity or destination entity of the packet satisfies the condition, the processor is configured to match an identity of a node generating the interest by using the public key.

13. The apparatus of claim 9, wherein while determining that the originating entity or destination entity of the packet satisfies the condition, the processor is configured to match a publisher of the content or a consumer of the content.

14. The apparatus of claim 9, wherein while determining that the originating entity or destination entity of the packet satisfies the condition, the processor is configured to match one or more of:
a network interface on which the packet arrived; and
a network address indicating where the packet is originated or destined.

15. The apparatus of claim 9, wherein while determining that the originating entity or destination entity of the packet satisfies the condition, the processor is configured to verify stochastically the routing policy by router nodes, thus enabling an overall expected level of policy compliance and verification.

16. The apparatus of claim 9, wherein the processor is further configured to propagate the routing policy to an upstream node, whereby the upstream node can optionally enforce the routing policy and filter content.

17. A computer-readable storage device storing instructions that when executed by a computer cause the computer to perform a method for controlling the spread of interests and content in a content centric network, the method comprising:
receiving a packet including a piece of content or an interest for the content, wherein the packet further includes a hierarchically structured name of the content;
identifying, using a longest-matching lookup of the hierarchically structured name of the content, a routing policy applicable to a longest matching prefix of the hierarchically structured name, wherein the routing policy specifies a condition associated with an originating entity or a destination entity of the packet, and a forwarding action corresponding to the condition;
in response to determining that the prefix matches the hierarchically structured name of the content and that the originating entity or destination entity of the packet satisfies the condition in the routing policy, forwarding the packet according to the forwarding action specified in the routing policy;
in response to determining that the originating entity or destination entity of the packet does not satisfy the condition in the routing policy, forwarding the packet according to a default forwarding action; and
defeating a denial-of-service attack against a policy enforcement system by greylisting a public key held by a signer of the content so that automatic retrieval of the public key is deferred.

18. The storage device of claim 17, wherein routing the packet comprises one or more of:
dropping content packets, thereby preventing creation of content with a certain name;

dropping interest packets, thereby preventing interests from circulating;
forwarding the packet to another node;
copying or redirecting the packet; and
deferring action on the packet.

19. The storage device of claim 17, wherein determining that the originating entity or destination entity of the packet satisfies the condition comprises matching an identity of the signer of the content by using a credential held by the signer of the content.

20. The storage device of claim 17, wherein determining that the originating entity or destination entity of the packet satisfies the condition comprises matching an identity of a node generating the interest by using the public key.

21. The storage device of claim 17, wherein determining that the originating entity or destination entity of the packet satisfies the condition comprises matching a publisher of the content or a consumer of the content.

22. The storage device of claim 17, wherein determining that the originating entity or destination entity of the packet satisfies the condition comprises matching one or more of:
   a network interface on which the packet arrived; and
   a network address indicating where the packet is originated or destined.

23. The storage device of claim 17, wherein the method further comprises stochastically verifying the routing policy by router nodes, thus enabling an overall expected level of policy compliance and verification.

24. The storage device of claim 17, wherein the method further comprises propagating the routing policy to an upstream node, whereby the upstream node can optionally enforce the routing policy and filter content.

* * * * *